(12) United States Patent
Dong et al.

(10) Patent No.: US 9,866,809 B2
(45) Date of Patent: Jan. 9, 2018

(54) IMAGE PROCESSING SYSTEM WITH ALIASING DETECTION MECHANISM AND METHOD OF OPERATION THEREOF

(71) Applicant: Sony Corporation, Tokyo (JP)

(72) Inventors: Xiaogang Dong, Boyds, MD (US); Jiro Takatori, Tokyo (JP); Tak-Shing Wong, Fremont, CA (US)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 14/946,247

(22) Filed: Nov. 19, 2015

(65) Prior Publication Data

US 2017/0150111 A1    May 25, 2017

(51) Int. Cl.
  *H04N 9/64* (2006.01)
  *G06T 3/40* (2006.01)

(52) U.S. Cl.
  CPC .......... *H04N 9/646* (2013.01); *G06T 3/4015* (2013.01)

(58) Field of Classification Search
  CPC ...... H04N 9/646; H04N 5/238; G06T 3/4015; G06T 5/002; G06T 2200/12
  See application file for complete search history.

(56) References Cited

U.S. PATENT DOCUMENTS

| 8,743,229 B2 | 6/2014 | Kim | |
| 2015/0092089 A1* | 4/2015 | Vitsnudel | G06T 5/002 348/242 |
| 2015/0334359 A1* | 11/2015 | Hayashi | G06T 5/003 348/242 |

OTHER PUBLICATIONS

Ma et al., "Optimal Image Acquisition by Auto-Defocusing", "Digital Photograpy VII", 2011, pp. 1-8, vol. 7876, No. 787605, SPIE-IS&T Electronic Imaging.

* cited by examiner

*Primary Examiner* — Christopher K Peterson
(74) *Attorney, Agent, or Firm* — Haverstock & Owens LLP (57) ABSTRACT

An image processing system, and a method of operation thereof, includes: an imaging sensor and lens assembly for receiving a first shot; and a defocus blur unit for calculating a defocus blur based on the first shot; wherein: the imaging sensor is for receiving a second shot with the defocus blur; and further comprising: a low-pass filter for generating a low-pass image by filtering the first shot based on the defocus blur; a comparison unit for comparing the low-pass image with the second shot for detecting a color aliasing; and a correction unit for correcting the color aliasing in the first shot.

19 Claims, 6 Drawing Sheets

IMAGE PROCESSING SYSTEM WITH ALIASING DETECTION MECHANISM AND METHOD OF OPERATION THEREOF

TECHNICAL FIELD

The present invention relates generally to an image processing system and more particularly to system for image processing with aliasing detection.

BACKGROUND ART

The integration of camera systems into devices has created a large variety of systems of different shapes and sizes. These devices include smart phones, surveillance cameras, wearable cameras, camcorders, digital single-lens reflex cameras, mirror-less cameras, and tablets, as examples.

These camera systems can produce tradeoffs in image quality, device size, and costs. However, the desire for improved image quality remains the same as the systems and capture platforms may change. For example, digital images and video frames can have issues with image quality based on sharpness, noise, distortions, artifacts, and chromatic aberration.

In image processing and photography, aliasing is an effect that causes different signals to become indistinguishable or aliases of one another when sampled. Any digital image sampling system may suffer from aliasing when the input signal's frequency is higher than the Nyquist frequency of the system. For digital images, distortions and artifacts can result when the image reconstructed from samples is different from the original scene. For digital color images reconstructed by color image sampling systems, colors different from those in the actual scenes may appear in some regions of reconstructed color images due to aliasing. Such false colors are more noticeable and generally call "color aliasing".

Most existing modern color imagine sensors have a color filter array (CFA), which is a mosaic of tiny color filters placed over each pixel. The most famous CFA pattern is the Bayer pattern. Imaging sensors equipped with a CFA tend to suffer from color aliasing from processing. In order to suppress color aliasing, filters such as optical anti-aliasing filters are generally applied in front of a color-imaging sensor. However, these filters result in a tradeoff in picture quality as the filters reduce the overall sharpness of a captured image.

Thus, a need still remains for an image processing system that can deliver sharpness in picture quality while still removing and suppressing the disadvantages of color aliasing. In view of the increasing demand for providing higher resolution images and videos, it is increasingly critical that answers be found to these problems.

Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system including: receiving a first shot; calculating a defocus blur based on the first shot; receiving a second shot with the defocus blur; generating a low-pass image by filtering the first shot based on the defocus blur; comparing the low-pass image with the second shot for detecting a color aliasing; and correcting the color aliasing in the first shot.

The present invention provides an image processing system, including: an imaging sensor and lens assembly for receiving a first shot; and a defocus blur unit for calculating a defocus blur based on the first shot; wherein: the imaging sensor is for receiving a second shot with the defocus blur; and further comprising: a low-pass filter for generating a low-pass image by filtering the first shot based on the defocus blur; a comparison unit for comparing the low-pass image with the second shot for detecting a color aliasing; and a correction unit for correcting the color aliasing in the first shot.

Certain embodiments of the invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "unit" referred to herein means a hardware device, such as an application specific integrated circuit, combinational logic, core logic, integrated analog circuitry, or a dedicated state machine.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Figure 1:
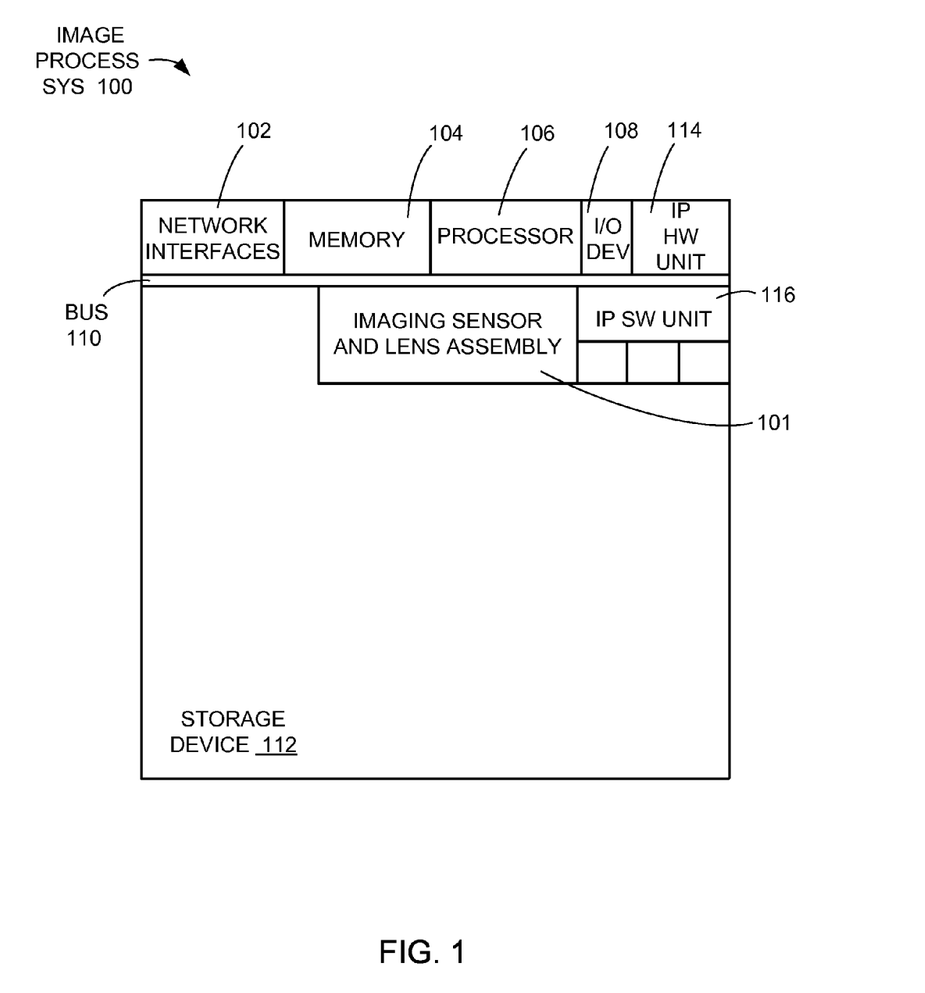
FIG. 1 is an example of a block diagram of an image processing system with aliasing detection mechanism in an embodiment of the present invention.

Referring now to FIG. 1, therein is shown an example of a block diagram of an image processing system 100 with aliasing detection mechanism in an embodiment of the present invention. The image processing system 100 can be used to acquire, store, compute, communicate, and display information including images and videos.

The image processing system 100 can include a hardware structure implemented with any number of hardware units including an imaging sensor and lens assembly 101, network interfaces 102, a memory 104, a processor 106, input/output devices 108, a bus 110, and a storage device 112.

The imaging sensor and lens assembly 101 can include lenses, digital image sensors, mirrors, motors, other optical or mechanical components, or a combination thereof for receiving and capturing images. An example of the network interfaces 102 can include a network card connected to an Ethernet or other types of local area networks (LAN).

The memory 104 can include any computer memory types. The processor 106 can include any processing unit with sufficient speed chosen for data control and computation operations of the hardware and software units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and a flash memory card. The storage device 112 and the memory 104 can be used to store data for processed by any of the units in the image processing system 100.

The image processing system 100 can include an image processing hardware unit 114 and an image processing software unit 116. The image processing hardware unit 114 can include any hardware units including a circuitry, a processor, an integrated circuit, and integrated circuit cores. The image processing software unit 116 can include software including machine code, firmware, embedded code, and application software.

The image processing system 100 can include various computer vision, machine learning, and image restoration applications including super-resolution, in-painting, texture synthesis, segmentation, object/scene/texture categorization, and other image and video processing implementations. These applications can be implemented with the image processing hardware unit 114, the image processing software unit 116, or any combination thereof.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a digital camera, a digital camcorder, a camera phone, a multimedia player, a video player, a DVD writer/player, a television, a home entertainment system, or any other computing devices. As a specific example, the computing devices can include point-and-shoot cameras, mirrorless interchangeable lens cameras, single-lens reflex (SLR) cameras, and camcorders.

Figure 2:
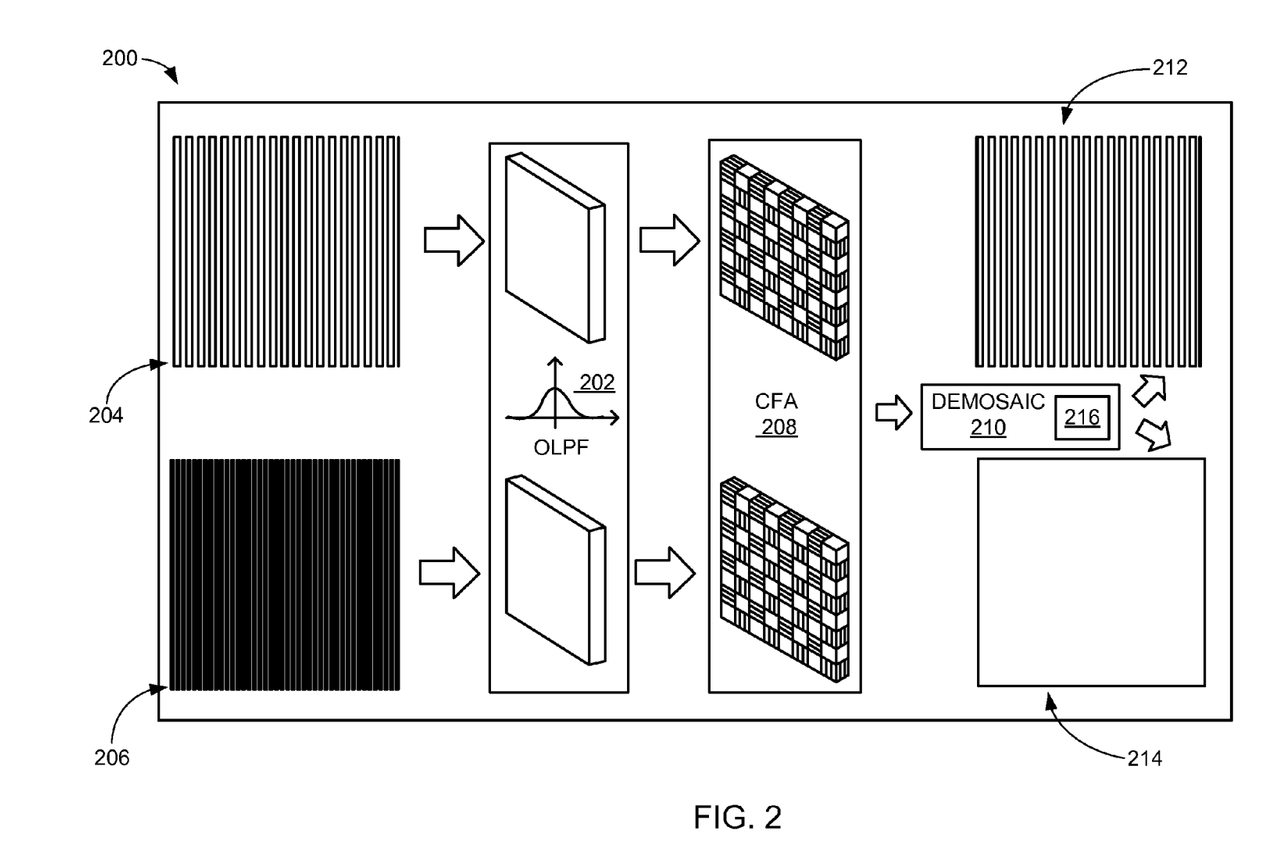
FIG. 2 is a first example of an image processing system.

Referring now to FIG. 2, therein is shown a first example of an image processing system 200. The example shows a color image pipeline for two input signals being processed between an image source and an image renderer. The example can include image inputs, an optical low pass filter 202, a color filter array 208, and captured images.

The image inputs can include a first input 204 and a second input 206. The first input 204 can include an image input with a frequency less than the Nyquist frequency, which is half of the sampling frequency of the color filter array 208. The second input 206 can include an image input with a frequency greater than the Nyquist frequency.

The image processing system 200 can include the optical low pass filter 202 (OLPF) or anti-aliasing filter (AAF). The optical low pass filter 202 is an optical component used before a signal sampler to restrict the bandwidth of a signal to satisfy, approximately or completely, the sampling theorem over the band of interest.

For example, the optical low pass filter 202 can be a structure built into a digital camera system, such as the imaging sensor and lens assembly 101 of FIG. 1, and can be located directly in front of the image sensor of the camera. The optical low pass filter 202 can suppress high frequency image information and reduce the effects of moiré and false color caused by the high frequency waves, such as the signals from the second input 206.

The image processing system 200 can include the color filter array 208, which is a mosaic of tiny color filters placed over the pixel sensors of an image sensor to capture color information. For illustrative purposes, the color filter array 208 is shown as a Bayer sensor although it is understood that the image processing system 200 can use other types of color filter arrays. The color filter array 208 can include RGBE filters, CYYJ filters, EXR filters, and RGBE filters, as examples.

Image inputs can pass through the optical low pass filter 202 and the color filter array 208 to be captured by a sensor. A demosaic operation 210 or color filter array interpolation is performed on the inputs for interpolating the missing color samples caused by the color filter array 208. For example, the demosaic operation 210 is used to reconstruct a full color image from an incomplete color sample output from the color filter array 208.

The first input 204 can produce a first captured image 212, when the first input 204 is processed through the color image pipeline. For illustrative purposes, the first captured image 212 is shown to be identical to the first input 204.

The first captured image 212 is an accurate image compared to the first input 204 because the first input 204 included a signal frequency less than the Nyquist frequency that is half of the sampling frequency. Because of the low frequency of the first input 204, information from the input signal is not filtered out by the optical low pass filter 202 and thus a more accurate image is created after the demosaic operation 210.

The second input 206 can produce a second captured image 214 when the first input 204 is processed through the color image pipeline. For illustrative purposes, the second captured image 214 is solid mid grey and shows missing details from the second input 206. The second input 206 includes a signal frequency greater than the Nyquist frequency.

The second captured image 214 is missing information, such as the fine line information shown in the second input 206 because of the filtering of high frequency signals by the optical low pass filter 202. After the demosaic operation 210, the second captured image 214 is shown as a solid mid gray, which is missing a lot of the information and details from the second input 206.

The first captured image 212 and the second captured image 214 do not include any color aliasing 216 because the optical low pass filter 202 suppresses the color aliasing 216 that can occur through the color-processing pipeline. For example, the optical low pass filter 202 prevents false color and moiré that can ruin a picture. The trade-off to using the optical low pass filter 202 is a softening of the image.

Figure 3:
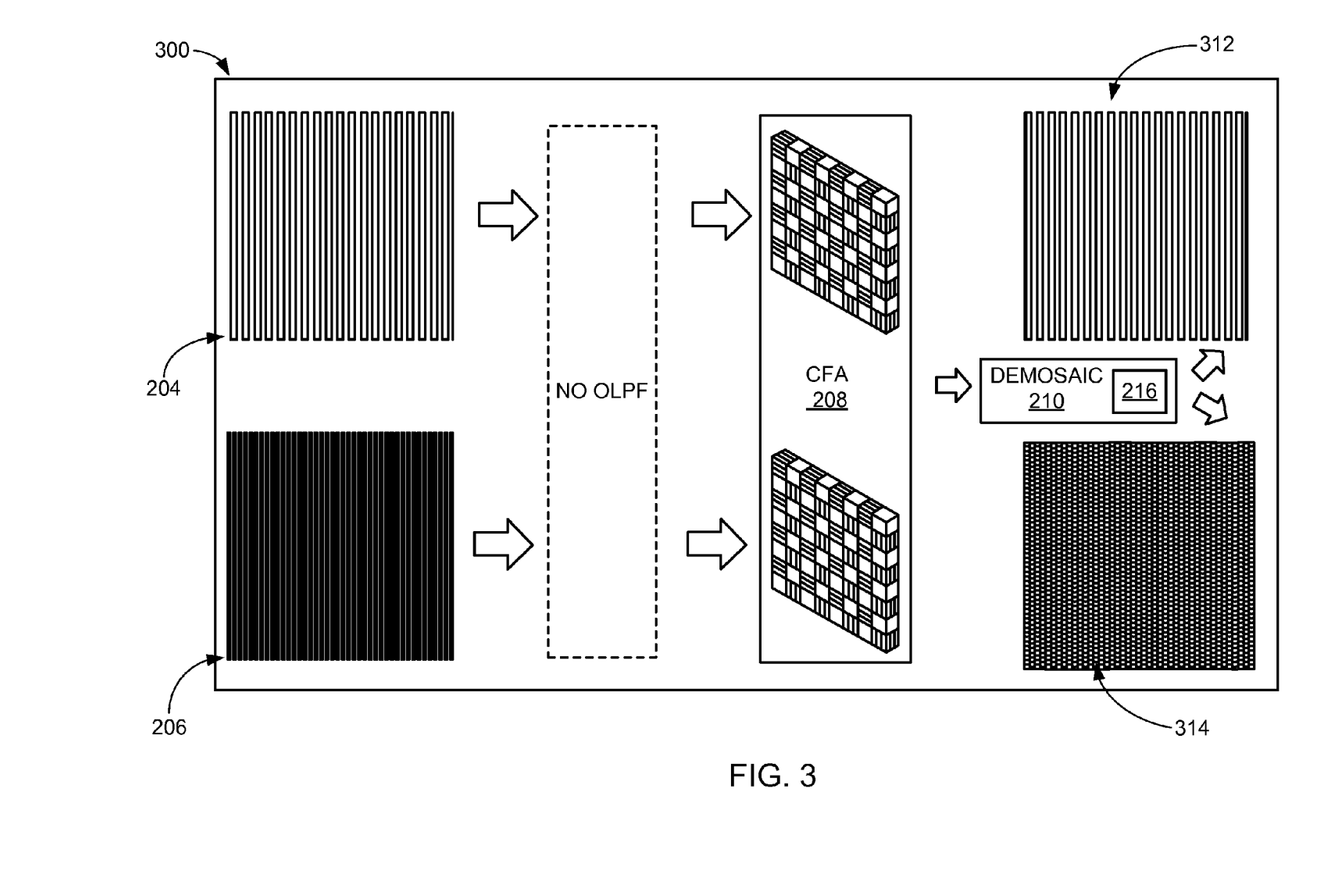
FIG. 3 is a second example of an image processing system.

Referring now to FIG. 3, therein is shown a second example of an image processing system 300. The image processing system 300 can be identical to the image processing system 200 of FIG. 2, except the optical low pass filter 202 of FIG. 2 is removed. The image processing system 300 can include the first input 204, the second input 206, and the color filter array 208.

The image inputs of the first input 204 and the second input 206 have the same frequency properties as the image inputs shown in FIG. 2. The lack of the optical low pass filter 202 in the image processing system 300 generates a third captured image 312 that is potentially sharper than the first captured image 212 of FIG. 2. Because the first input 204 included a signal equal to or less than the Nyquist frequency, the third captured image 312 is shown as being identical to the first input 204, as an example.

A fourth captured image 314 can be generated from the second input 206. The fourth captured image 314 can include the color aliasing 216 because of the signals from the second input 206 that are higher than the Nyquist frequency and the lack of the optical low pass filter 202. The fourth captured image 314 shows false details of the example compared to the details of the second input 206.

Although the optical low pass filter 202 suppresses the color aliasing 216 that can occur, the optical low pass filter 202 also includes disadvantages such that overall sharpness of the image is reduced. To achieve better sharpness of images, the optical low pass filter 202 is removed in alternative image processing systems. Further, it has been found that the removal of the physical optical low pass filters in camera systems reduce costs and simplifies design. However, the color aliasing 216 that is shown by the fourth captured image 314 results in some of the captured inputs from systems without optical low pass filters.

Figure 4:
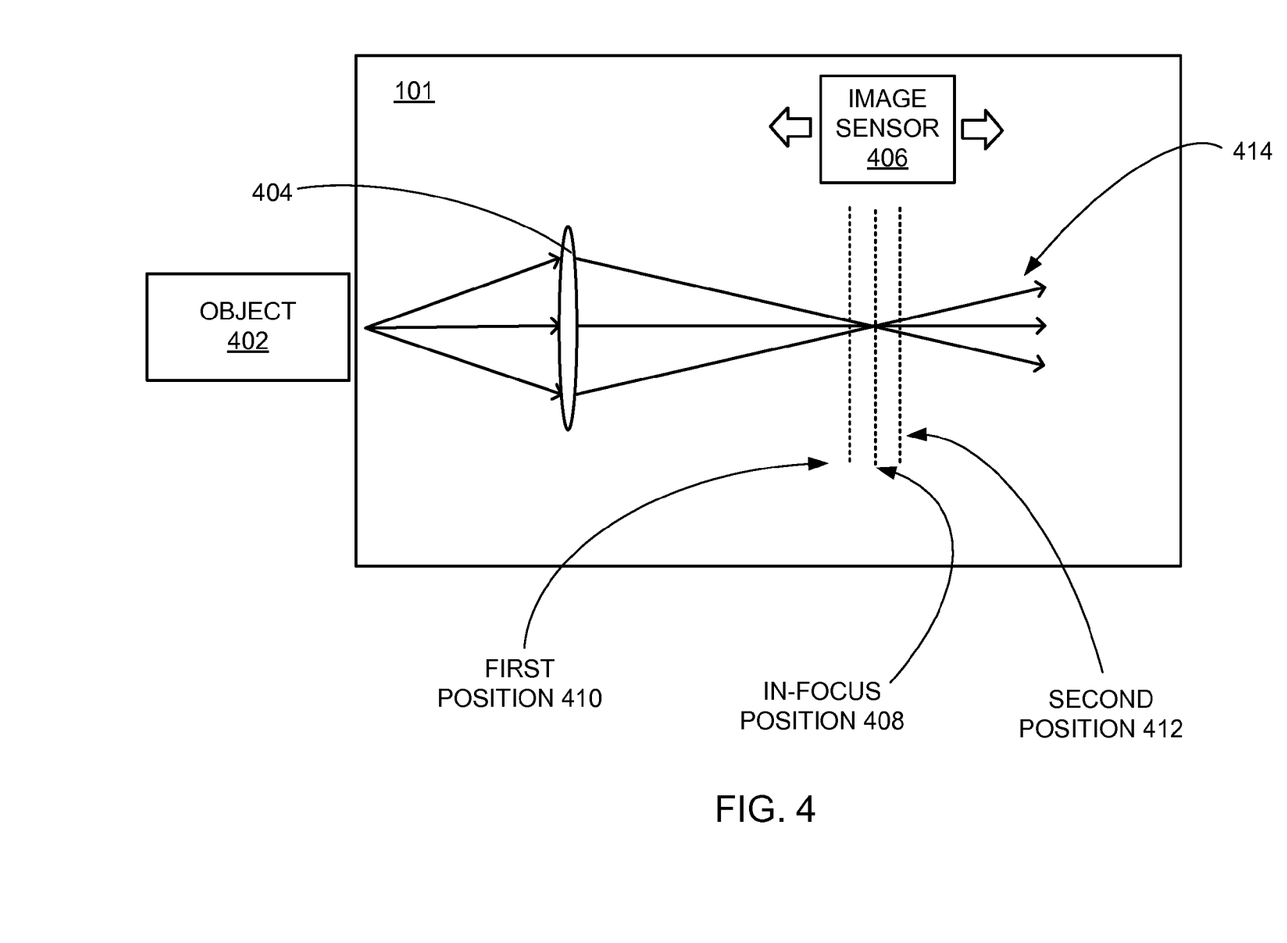
FIG. 4 is an example diagram of the imaging sensor and lens assembly of FIG. 1.

Referring now to FIG. 4, therein is shown an example diagram of the imaging sensor and lens assembly 101 of FIG. 1. The example diagram shown in FIG. 4 is used to show how the imaging processing system 100 of FIG. 1 can create intentional defocusing and blurring by moving either a lens element or a sensor. The example includes an object 402, a lens 404 and an image sensor 406.

It is understood that the imaging sensor and lens assembly 101 can include multiple lens elements and other components. For illustrative purposes, only a single lens is shown in FIG. 4.

The image sensor 406 can include charge-coupled devices (CCD), complementary metal-oxide-semiconductor (CMOS), and N-type metal-oxide-semiconductor (NMOS) as examples. For illustrative purposes, the example diagram shows a system where the image sensor 406 can be moved to different positions, although it is understood that the imaging sensor and lens assembly 101 can also include a movable lens system.

When the imaging sensor 406 is at an in-focus position 408, a capture of the object 402 is sharp and in-focus. When the imaging sensor 406 moves to an out-of-focus position, such as a first position 410 or a second position 412, the captured light rays spread in a larger area and create a blurring of captured images. Such a blur is called a defocus blur 414. The defocus blur 414 can be modeled as a low-pass filtering of the input signal of the object 402. The corresponding transfer functions of the low-pass filters are called the point spread functions. The actual point spread functions can depend on focal distance, object depth, aperture, distance to the center of images, and so on.

Many image-capturing tasks make sure that the image sensor 406 is at the in-focus position 408 so that the object 402 can be captured without any of the defocus blur 414. In order to filter out signal frequencies higher than the Nyquist frequency, the image sensor 406 can be intentionally put at the out-of-focus position since the defocus blur 414 can be modeled as a low-pass filtering of the input signal of the object 402. The distance of the sensor to the in-focus position 408 can be calculated based on focal distance, object depth, aperture, and so on.

Figure 5:
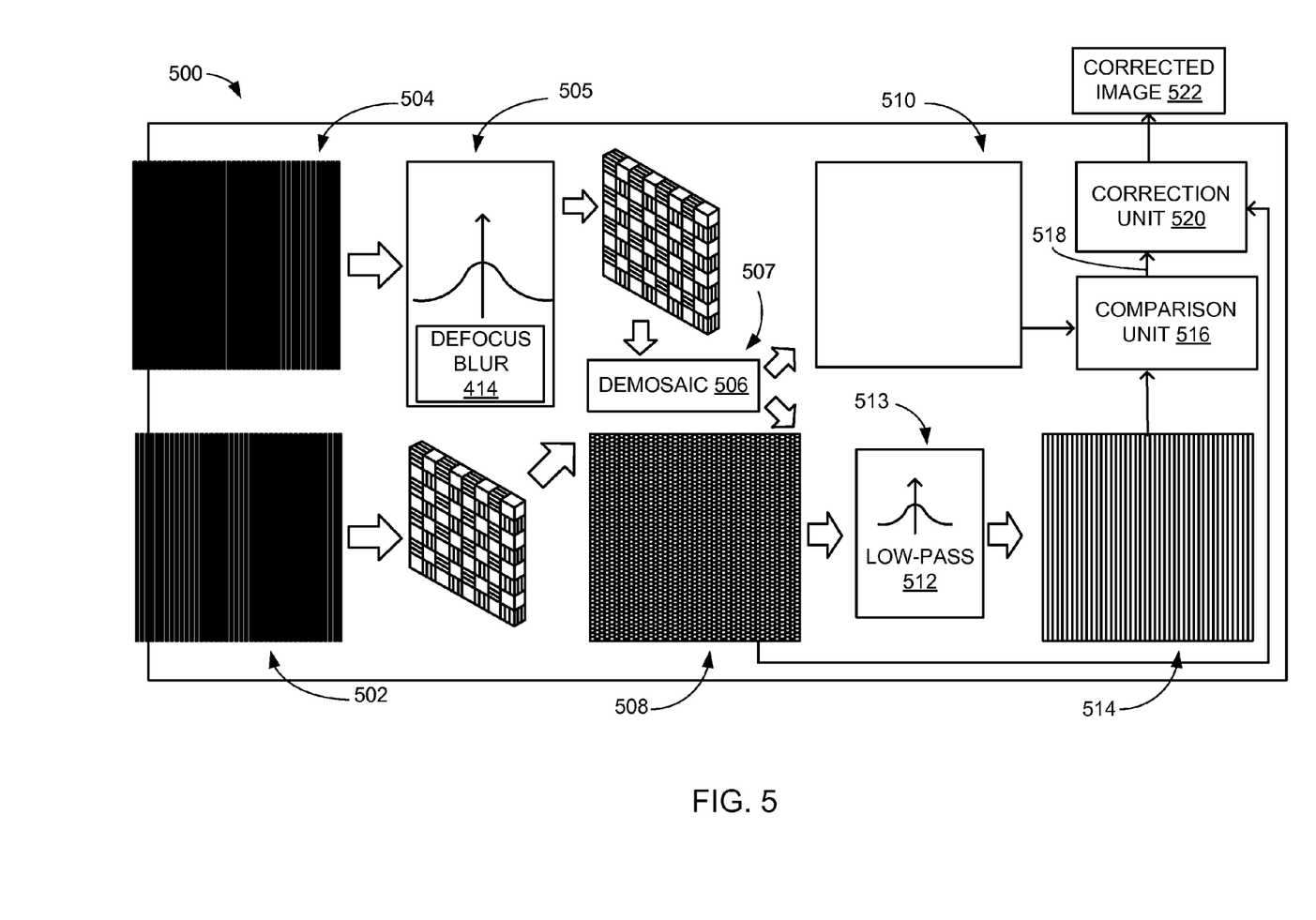
FIG. 5 is an image processing system with aliasing detection in an embodiment of the present invention.

Referring now to FIG. 5, therein is shown an image processing system 500 with aliasing detection in an embodiment of the present invention. The image processing system 500 can compare two images for color aliasing detection and correction. The image processing system 500 can include the same image source and image rendering components as shown in the image processing system 300 of FIG. 3.

The imaging sensor and lens assembly 101 of FIG. 1 can capture a first shot 502 and a second shot 504 of a scene, such as the object 402 of FIG. 4. The second shot 504 can immediately follow the first shot 502. The first shot 502 or in-focus shot can be an in-focus image capture of the object 402. The second shot 504 or out-of-focus shot can utilize the same setting as the first shot 502, except that the second shot 504 is out-of-focus.

The second shot 504 can include the defocus blur 414 of FIG. 4, which is modeled to simulate the effect of the optical low pass filter 202 of FIG. 2. The defocus blur 414, or amount of blur needed to model a low-pass filter in the second shot 504, can be calculated by a defocus blur unit 505. An amount of the defocus blur 414 is calculated to serve as a filter that is modeled to perform the same function as the optical low pass filter 202. The amount of blur needed in the defocus blur 414 is calculated based on camera information such as aperture and focal distance of the imaging sensor and lens assembly 101 as well as the object depth.

The lens position of the lens 404 of FIG. 4 can be moved to create the blur need for the defocus blur 414. For example, the lens 404 can be moved to the first position 410 or the second position 412 based on the amount of the defocus blur 414 needed. The second shot 504 can be captured at the lens position that produces the required blur.

A demosaic operation 506 can be performed on the first shot 502 and the second shot 504 by a demosaic unit 507. The demosaic operation 506 generates a first demosaic image 508 from the first shot 502 and a second demosaic image 510 from the second shot 504.

The first demosaic image 508 can include the color aliasing 216 of FIG. 2 because the source of the image was taken from an in-focus capture without any anti-aliasing filtering. The second demosaic image 510 does not include the color aliasing 216 because the defocus blur 414 filters out signals containing frequencies higher than the Nyquist frequency. For illustrative purposes, the second demosaic image 510 is shown as a solid mid grey color.

After the calculation of the defocus blur 414 and the demosaic operation 506, a low-pass filter operation 512 can be performed by a low-pass filter 513 on the first demosaic image 508. The low-pass filter operation 512 can mimic the defocus blur 414 performed on the second shot 504 for generating a low-pass image 514. The low-pass image 514 is a filtered version of the first demosaic image 508.

A comparison unit 516 can perform a comparison operation between the second demosaic image 510 and the low-pass image 514. The comparison unit 516 can detect the color aliasing 216 if there is a color mismatch between the second demosaic image 510 and the low-pass image 514. Further, a correction unit 520 can determine true color of the first demosaic image 508.

It has been discovered that the image processing system 500 can detect the true color of any pixel within the first demosaic image 508 by comparing the color of a region nearby the pixel in the low-pass image 514 to the same region in the second demosaic image 510. The comparison using the second demosaic image 510 provides more accurate true color over single image methods because the true color information for the pixel often does not exist in the first demosaic image 508 when the first demosaic image 508 is suffered from or adversely affected by the color aliasing 216.

The correction unit 520 can generate a corrected image 522 using information from the comparison unit 516 and the first demosaic image 508. The corrected image 522 can have any of the color aliasing 216 removed by the correction unit 520. It has been discovered that the corrected image 522 includes the sharpness from the first demosaic image 508 taken without the optical low pass filter 202 but the corrected image 522 also does not include any of the color aliasing 216 that results from absence of the optical low pass filter 202.

If the comparison unit 516 does not detect a color mismatch between the low-pass image 514 and the second demosaic image 510, the image processing system 500 can output the first demosaic image 508 as the corrected image 522. It has been found that the image processing system 500 can be used to verify that an input signal has a frequency lower than the Nyquist frequency by comparing the low-pass image 514 with the second demosaic image 510 for any color mismatch.

It has been discovered that the image processing system 500 can generate images that recreate the sharpness of systems without optical low pass filters while also correcting for any of the color aliasing 216. The image processing system 500 uses the defocus blur 414 to model the filtering functions of optical low pass filters in the second shot 504. The in-focus shot can be compared to the second shot 504 for color aliasing detection and color aliasing correction.

It has also been discovered that the image processing system 500 can use the low-pass image 514 and the second demosaic image 510 for determining the true color of a pixel in the captured image.

The functions and the units described above can be implemented using software, hardware, or a combination thereof. For example, the functions and the units can be implemented using a processor and/or dedicated hardware, image processing software and/or hardware, or a combination thereof. As a specific example, the defocus blur unit 505, the demosaic unit 507, the low-pass filter 513, the comparison unit 516, or the correction unit 520 can be implemented using the processor 106 of FIG. 1, the dedicated hardware, the image processing hardware unit 114 of FIG. 1, the image processing software unit 116 of FIG. 1, or a combination thereof.

Figure 6:
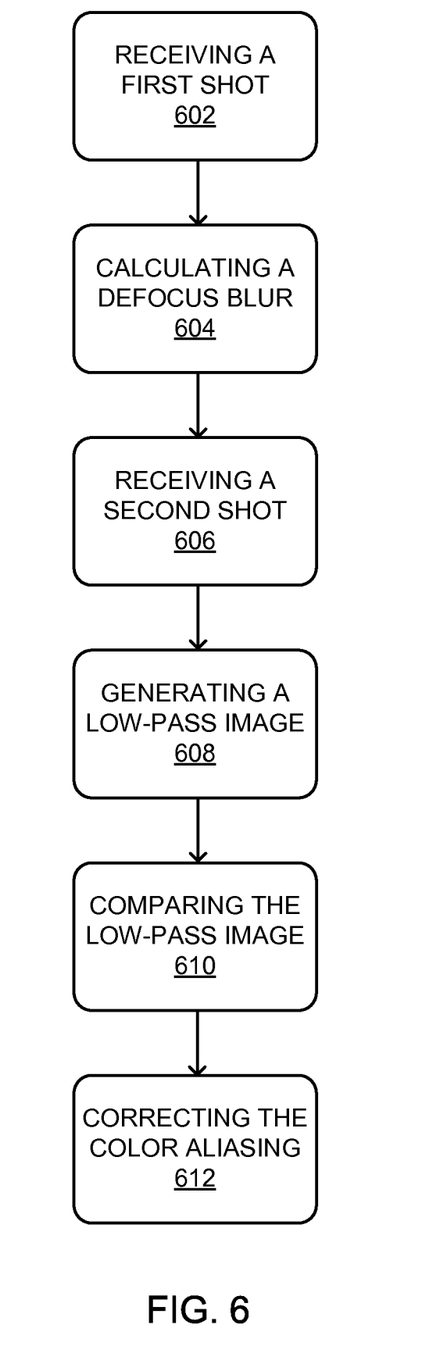
FIG. 6 is a flow chart of a method of operation of an image processing system in a further embodiment of the present invention.

Referring now to FIG. 6, therein is shown a flow chart of a method 600 of operation of an image processing system in a further embodiment of the present invention. The method 600 includes: receiving a first shot in a block 602; calculating a defocus blur based on the first shot in a block 604; receiving a second shot with the defocus blur in a block 606; generating a low-pass image by filtering the first shot based on the defocus blur in a block 608; comparing the low-pass image with the second shot for detecting a color aliasing in a block 610; and correcting the color aliasing in the first shot in a block 612.

Thus, it has been discovered that the image processing system 100 of FIG. 1 of the present invention furnishes important and heretofore unknown and unavailable solutions, capabilities, and functional aspects for an image processing system with an optical flow recovery mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving a first shot with an imaging sensor, wherein the first shot has a frequency less than a specified frequency;
   calculating a defocus blur based on the first shot;
   receiving a second shot with the defocus blur with the imaging sensor, wherein the second shot has a frequency greater than the specified frequency;
   performing a demosaic operation on the first shot for generating a first demosaic image;
   performing the demosaic operation on the second shot for generating a second demosaic image for processing the low-pass image;
   generating a low-pass image by filtering the first demosaic image based on the defocus blur with a low-pass filter;
   comparing the low-pass image with the second demosaic image for detecting a color aliasing; and
   correcting the color aliasing in the first shot.

2. The method as claimed in claim 1 wherein comparing the low-pass image includes detecting a color mismatch between the low-pass image and the second shot.

3. The method as claimed in claim 1 further comprising detecting a true color by comparing a pixel location of the low-pass image to an identical pixel location in the second shot.

4. The method as claimed in claim 1 further comprising generating a corrected image by removing the color aliasing of the low-pass image based on the second shot.

5. A method of operation of an image processing system comprising:
   capturing a first shot with an imaging sensor, wherein the first shot has a frequency less than a specified frequency;
   calculating a defocus blur based on the first shot;
   capturing a second shot with the defocus blur with the imaging sensor, wherein the second shot has a frequency greater than the specified frequency;
   generating a first demosaic image from the first shot and a second demosaic image from the second shot;
   generating a low-pass image by filtering the first demosaic image based on the defocus blur with a low-pass filter;
   comparing the low-pass image with the second demosaic image for detecting a color aliasing; and
   correcting the color aliasing in the first shot.

6. The method as claimed in claim 5 wherein capturing the second shot includes adjusting a lens position of an image sensor assembly based on the defocus blur.

7. The method as claimed in claim 5 wherein comparing the low-pass image includes verifying a color of the low-pass image with the second demosaic image.

8. The method as claimed in claim 5 wherein capturing the second shot includes adjusting a lens to an out-of-focus position.

9. The method as claimed in claim 5 wherein capturing the first shot includes adjusting a lens to an in-focus position.

10. An image processing system comprising:
    an imaging sensor and lens assembly for receiving a first shot, wherein the first shot has a frequency less than a specified frequency; and
    a defocus blur unit for calculating a defocus blur based on the first shot;
    wherein:
    the imaging sensor is for receiving a second shot with the defocus blur, wherein the second shot has a frequency greater than the specified frequency; and
    further comprising:
    a low-pass filter for generating a low-pass image by filtering the first shot based on the defocus blur;
    a comparison unit for comparing the low-pass image with the second shot for detecting a color aliasing; and
    a demosaic unit for generating a first demosaic image from the first shot and a second demosaic image from the second shot; and
    wherein:
    the low-pass filter is for generating the low-pass image by filtering the first demosaic image based on the defocus blur; and
    the comparison unit is for comparing the low-pass image with the second demosaic image for detecting the color aliasing; and
    a correction unit for correcting the color aliasing in the first shot.

11. The system as claimed in claim 10 wherein the comparison unit is for detecting a color mismatch between the low-pass image and the second shot.

12. The system as claimed in claim 10 wherein the correction unit is for detecting a true color by comparing a pixel location of the low-pass image to an identical pixel location in the second shot.

13. The system as claimed in claim 10 wherein the correction unit is for generating a corrected image by removing the color aliasing of the low-pass image based on the second shot.

14. The system as claimed in claim 10 wherein the imaging sensor and lens assembly is for adjusting a lens position of an image sensor assembly based on the defocus blur.

15. The system as claimed in claim 10 wherein the comparison unit is for comparing the low-pass image including verifying a color of the low-pass image with the second demosaic image.

16. The system as claimed in claim 10 wherein the imaging sensor and lens assembly is for adjusting a lens to an out-of-focus position.

17. The system as claimed in claim 10 wherein the imaging sensor and lens assembly is for adjusting a lens to an in-focus position.

18. The system as claimed in claim 10 wherein the specified frequency is the Nyquist frequency.

19. The system as claimed in claim 10 wherein the defocus blur is an amount of blur to model the low pass filter, wherein the amount of blur is calculated based on aperture information, focal distance of the imaging sensor and lens assembly, and object depth.

* * * * *